United States Patent [19]

Nara

[11] Patent Number: 4,479,187

[45] Date of Patent: Oct. 23, 1984

[54] CLASSIFYING APPARATUS WITH AUTOMATIC REMOVAL DEVICE

[75] Inventor: Seietsu Nara, Yokohama, Japan

[73] Assignee: Tokyo Shibaura Denki Kabushiki Kaisha, Japan

[21] Appl. No.: 328,397

[22] Filed: Dec. 7, 1981

[30] Foreign Application Priority Data

Dec. 19, 1980 [JP] Japan ............................... 55-178732

[51] Int. Cl.³ ......................... G06F 15/24; B65G 1/06; B07C 5/00

[52] U.S. Cl. .................................... 364/478; 414/134; 209/584

[58] Field of Search ................ 364/478; 209/584, 564, 209/569, 559, 563, 583, 546, 534, 552, 900; 414/134, 136, 51

[56] References Cited

U.S. PATENT DOCUMENTS

| | | | |
|---|---|---|---|
| 3,757,939 | 9/1973 | Henig | 414/134 X |
| 3,782,541 | 1/1974 | Wood | 209/584 |
| 3,837,484 | 9/1974 | Ruckebier et al. | 364/478 X |
| 4,008,813 | 2/1977 | Leersnijder | 414/134 X |
| 4,047,712 | 9/1977 | Burkhardt et al. | 414/51 X |
| 4,167,476 | 9/1979 | Jackson | 209/900 X |
| 4,181,948 | 1/1980 | Jackson et al. | 364/478 |
| 4,195,347 | 3/1980 | MacMunn et al. | 364/478 |
| 4,244,672 | 1/1981 | Lund | 414/134 |
| 4,281,342 | 7/1981 | Ueda et al. | 364/478 X |
| 4,310,276 | 1/1982 | Castagnoli | 414/134 |

*Primary Examiner*—Edward J. Wise
*Attorney, Agent, or Firm*—Cushman, Darby & Cushman

[57] ABSTRACT

An automatic removal device of a classifying apparatus has a control circuit which includes a first detector to effect detection as to whether postal matter stacked in a stacking section provided with a removal mechanism is in a removal ready state before a full stack state, and a second detector, which effects detection as to whether the postal matter stacked in the stacking section is in the full stack state. When an empty transport section is brought to a position corresponding to the stacking section during a period from the detection of the removal ready state of the stacked matter in the stacking section before the full stack state to the detection of the full stacked state, or after the detection of the full stack state, these states being detected by the respective switches, the control circuit provides a control signal to a driving device for driving the removal mechanism of the stacking section, whereby the stacked matter in the stacking section is transferred onto the empty transport section.

2 Claims, 7 Drawing Figures

CLASSIFYING APPARATUS WITH AUTOMATIC REMOVAL DEVICE

BACKGROUND OF THE INVENTION

This invention relates to a classifying apparatus with an automatic removal device, which classifies or distributes sheet-like materials such as postal matter to be classified to a plurality of stacking sections arranged in a plurality of rows extending one above another according to classifying information provided on the matter and automatically removes classified groups of matter stacked in individual stacking sections for transfer portion taken from these stacking sections to the next process.

Recently, various automatic postal matter processing machines have been put to practical use for the purpose of saving man-hours in the postal business. Among these machines, there are automatic postal number reading and classifying apparatus for automatically reading postal numbers of postal matter and automatically classifying the postal matter for the individual read-out destinations. In the prior art apparatus of this sort, a plurality of stacking sections are arranged in a plurality of rows horizontally extending one above another. The classified postal matter groups stacked in the individual sections are manually taken out therefrom and bundled with destination cards attached to them by personnel in charge. Therefore, the operation of this apparatus requires exclusive personnel in charge of the afore-mentioned jobs. The personnel must move round wide areas and share extremely great burdens.

Japanese Utility Model Application Publication No. 52-22771 discloses an automatic sheet group takeout and transport apparatus, which automatically removes a sheet group stacked in a supply section for transferring it to a transport section through a removal mechanism and restraining the sides of the sheet group transferred to the transport section with a brush-like restraining member, and also which can prevent undesirable displacement of the sheet group due to variations experienced by the sheet group as the transport section is run when or after the sheet group is received by the transport section. Japanese U.M. Publication No. 52-22771, however, contains no disclosure about the removal of a sheet stack by the transport section when the supply section gets full of stacked sheets.

Therefore, a classifying apparatus with an automatic removal function, in which classified postal matter groups stacked in respective stacking sections are automatically removed and fed to a destination card attaching section and a bundling section as a subsequent steps.

As for the method of removing postal matter from the stacking sections, since a number of stacking sections are arranged side by side in a horizontal row, a method, in which the postal matter is pushed out rearward, i.e., toward the back side of the classifying apparatus and transferred to a horizontal transport path for being transported to the next step, is suitable. Also, since a plurality of horizontal stacking section rows are arranged one above another, a corresponding number of horizontal transport paths for transporting the postal matter transferred from the stacking section rows are necessary. In order to efficiently process the postal matter by using only a single set of subsequent step units such as the destination card attaching unit and the bundling unit, it is desirable that the postal matter discharged from the afore-mentioned plurality of horizontal transport paths ultimately join on a single transport line.

To realize this method, a system as shown in FIG. 1 has been contemplated.

In this classifying apparatus a, individual stacking sections b, c, d and provided with respective automatic push-out mechanisms (not shown). In this system, when a predetermined quantity of postal matter A is collected in one stacking section, it is automatically pushed out rearward and transported to one of a plurality of endless belt conveyers e, f, g provided for the respective stacking section rows b, c, d extending horizontally one above another, whereby it is transported in the horizontal direction. Then, it is transferred to an elevator and then to a transport line to be transported to a destination card attaching section and a bundling section.

In this system, however, the postal matter fully stacked in one stacking section is pushed out only when an empty tray is brought to a position corresponding to that section after the section receives full of postal matter.

Therefore, it is possible that the full stack of postal matter is detected right after an empty tray has left the stacking section. In such a case, it is necessary for the stacked postal matter to wait for a long time until the next empty tray comes to correspond to the stacking section.

SUMMARY OF THE INVENTION

An object of the invention is to provide a classifying apparatus with an automatic removal device, with which the take-out mechanism in each stacking section can be driven when an empty tray comes to a position corresponding to that stacking section after the classified matter has been stacked in that stacking section to a degree of a take-out ready state before a full stack state, thereby shortening the waiting period before the take-out of the classified stacked matter.

To achieve the above object, the classifying apparatus with an automatic removal device according to the present invention comprises means for reading out classifying information provided on matter such as sheets to be classified, a plurality of stacking sections arranged in a plurality of rows extending one above another each provided with a removal mechanism, means for distributing the matter to be classified to said plurality of stacking sections according to classifying information from the reading means, a transport section driven to successive positions corresponding to the respective stacking sections and receiving the distributedly stacked matter from the stacking section, means for detecting whether the distributedly stacked matter in the stacking section is in a removal ready state before a full stack state or in the full stack state, control means for providing a control signal to driving means described later when the empty transport section is brought to a position corresponding to the stacking section during a period from the detection of the removal ready state of the stacked matter in the stacking section before the full stack state to the detection of the full stack state, or after the detection of the full stack state, these states being detected by the detecting means and driving means for driving the removal mechanism of each stacking section according to the control signal from the control means such that the stacked matter is transferred onto the empty transport section.

With the classifying apparatus with automatic removal device according to the invention, with which the take-out mechanism in each stacking section can be driven when an empty transport section comes to a position corresponding to the stacking section after the classified matter has been stacked in the stacking section to a degree of a removal ready state before a full stack state, it is possible to shorten the waiting period before the removal of the classified stacked matter.

BRIEF DESCRIPTION OF THE DRAWINGS

The above and other objects and features of the present invention will be apparent from the following description taken in connection with the accompanying drawings, in which.

DETAILED DESCRIPTION OF THE PREFERRED EMBODIMENT

Figure 1:
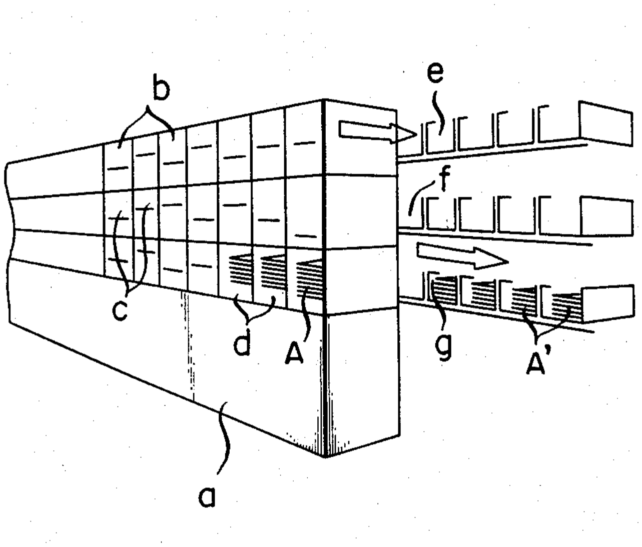
FIG. 1 (PRIOR ART)
FIG. 1 is a schematic perspective view showing a prior art classifying apparatus with automatic removal device.
Figure 2:
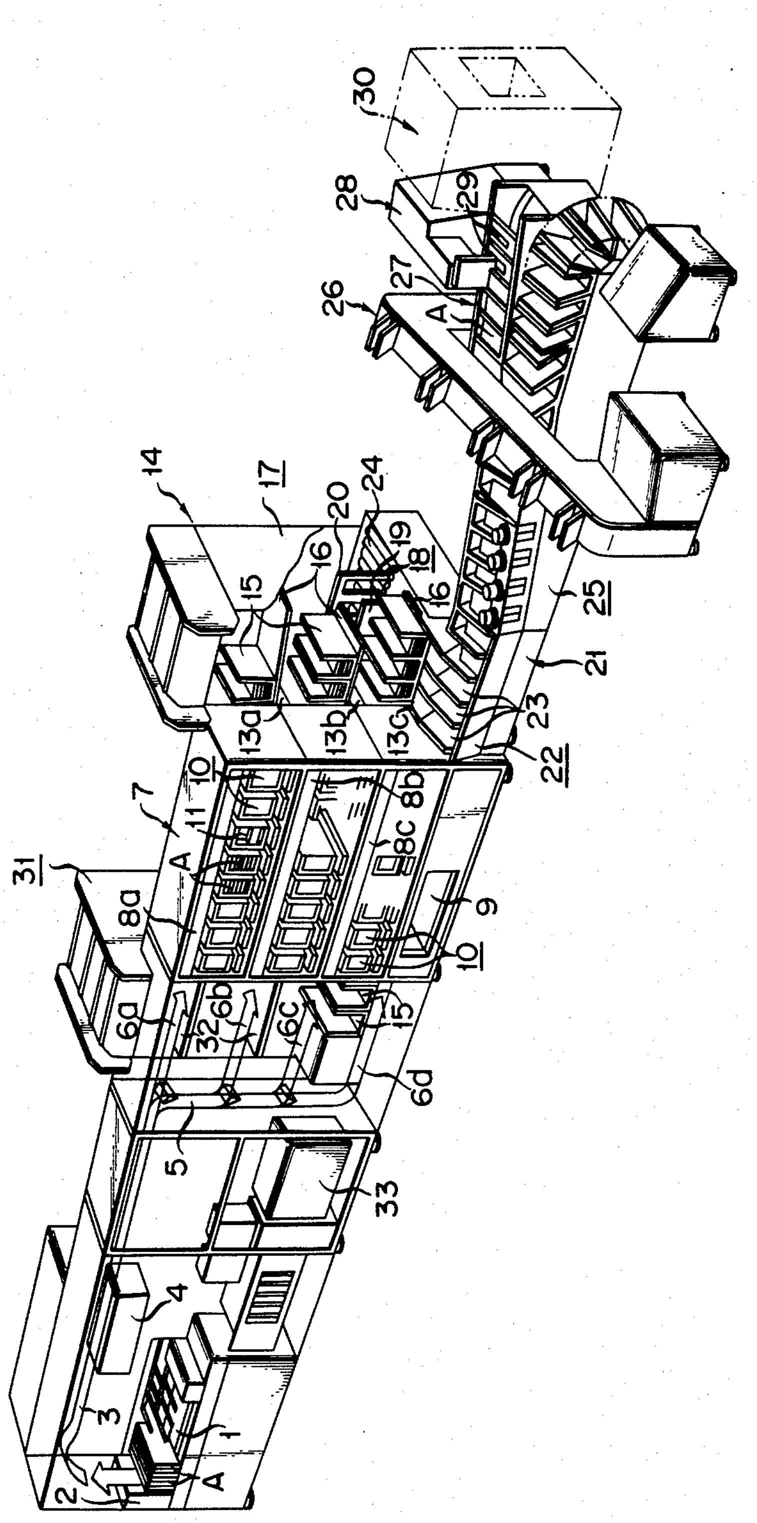
FIG. 2 is a perspective view showing one embodiment of the classifying apparatus with automatic take-out device according to the invention.

Referring to FIG. 2, postal matter A such as post cards and sealed letters collectively set upright in a supply section 1 are taken out one piece after another from the leading end piece by a removal section 2 and fed to a reading section 4 provided on a removal transfer path 3. In the reading section 4, a zip code of each postal matter piece is read out. The postal matter A is then distributed over a plurality of section transfer paths 6a, 6b, 6c and 6d extending horizontally one above another by a gate mechanism 5 according to data read out in the reading section 4. The distributed postal matter pieces are fed into either horizontal section transport path 8a, 8b or 8c or a discharge pocket 9 in a classifying section 7 having an automatic removal device.

In the classifying section 7, a plurality of stacking sections 10 are arranged in a row under each of the horizontal section transport paths 8a, 8b and 8c. The distributed postal matter pieces fed to the horizontal section transport path 8a, 8b or 8c are stacked in given stacking sections 10 according to the data read out in the reading section 4.

When a predetermined quantity of postal matter A is stacked in each stacking section 10 or when a compulsory push-out switch (not shown) is depressed, a removal mechanism, for instance a push-out mechanism (to be described later), of the stacking section 10 is actuated, whereby the postal matter A in the stacking section 10 is pushed toward the back side of the classifying section 7.

On the back side of the classifying section 7 with the automatic removal function, a tray circulating section 14 having a plurality of horizontal tray transport paths 13a, 13b and 13c extending horizontally one above another and corresponding to the respective stacking section rows 10 is provided. The postal matter stack A pushed out from the stacking section 10 is brought onto one of a plurality of trays 15 which are intermittently circulated along each of the horizontal tray transport paths 13a, 13b and 13c.

At the end of the horizontal tray transport paths 13a, 13b and 13c, an elevator mechanism section 17 is provided. In the elevator mechanism section 17, a plurality of tray receiving plates 16 are arranged one-above-another relation to correspond to the respective stacking sections and are intermittently circulated so that they are periodically stopped at positions corresponding to the end of the horizontal tray transport paths 13a, 13b and 13c. The tray receiving plates 16 receive trays 15 carrying postal matter A (or sometimes empty) from the horizontal tray transport paths 13a, 13b and 13c and transport them to a next step i.e. a separating section in a postal matter/tray separating mechanism section 18. In the postal matter/tray separating section, a postal matter push-out plate 19 and a tray pull-out plate 20 are being reciprocated. In the advancement stroke, the postal matter A in each tray 15 is pushed out toward the front side and transported to an aligning edge converting section 23 in an aligning edge converter 22 which constitutes a leading end of a common transport line 21. In the retreat stroke, each empty tray 15 is pulled toward the rear side into a leading end of a tray return path 24 of the tray circulating section 14.

The postal matter A transferred to the transport line 21 is transported by an aligning transporting unit 25 constituting the transport line 21. During this transport, an edge of the postal matter stack on the side opposite the destination and also an edge crossing the direction of transport are aligned. The postal matter group A having been aligned is transferred to a separate transport line 27 by a transfer mechanism 26 extending at right angles to the transport line 21. On the transport line 21, a destination card 29 is placed on top of the postal matter group by a destination card issuing and attaching unit 28. The postal matter group A with the destination card 29 attached to it is fed into a bundling unit 30 provided at the discharge end of the transport line 27. In the bundling unit 30, the postal matter group is bundled.

Meanwhile, each tray 15 transferred to the tray return path 24 by the postal matter/tray separating mechanism 18 is transported to an elevator mechanism 31, which is provided to correspond to the leading end of the horizontal tray transport paths 8a, 8b and 8c. In the elevator mechanism section 31, the received tray is transferred to one of a plurality of tray receiving plates 32 in this section by a tray transfer mechanism section (not shown). Each of the tray receiving plates 32 in the elevator mechamism section 31 is intermittently circulated so that it is progressively positioned to face the leading end of the horizontal tray transport paths 13a, 13b and 13c in the mentioned order. As each tray 15 faces the leading end of one of the horizontal tray transport paths 13a, 13b and 13c, it is pushed thereinto by a push-in mechanism (not shown). Every time the action of pushing tray into horizontal tray transfer path takes place, the trays 15 on the horizontal tray transport paths 13a, 13b and 13c are fed by one pitch, while the trays at the discharge end are transferred onto the tray receiving plates 16 in the elevator mechanism section 17. The system as a whole is controlled by a control section 33.

Figure 3:
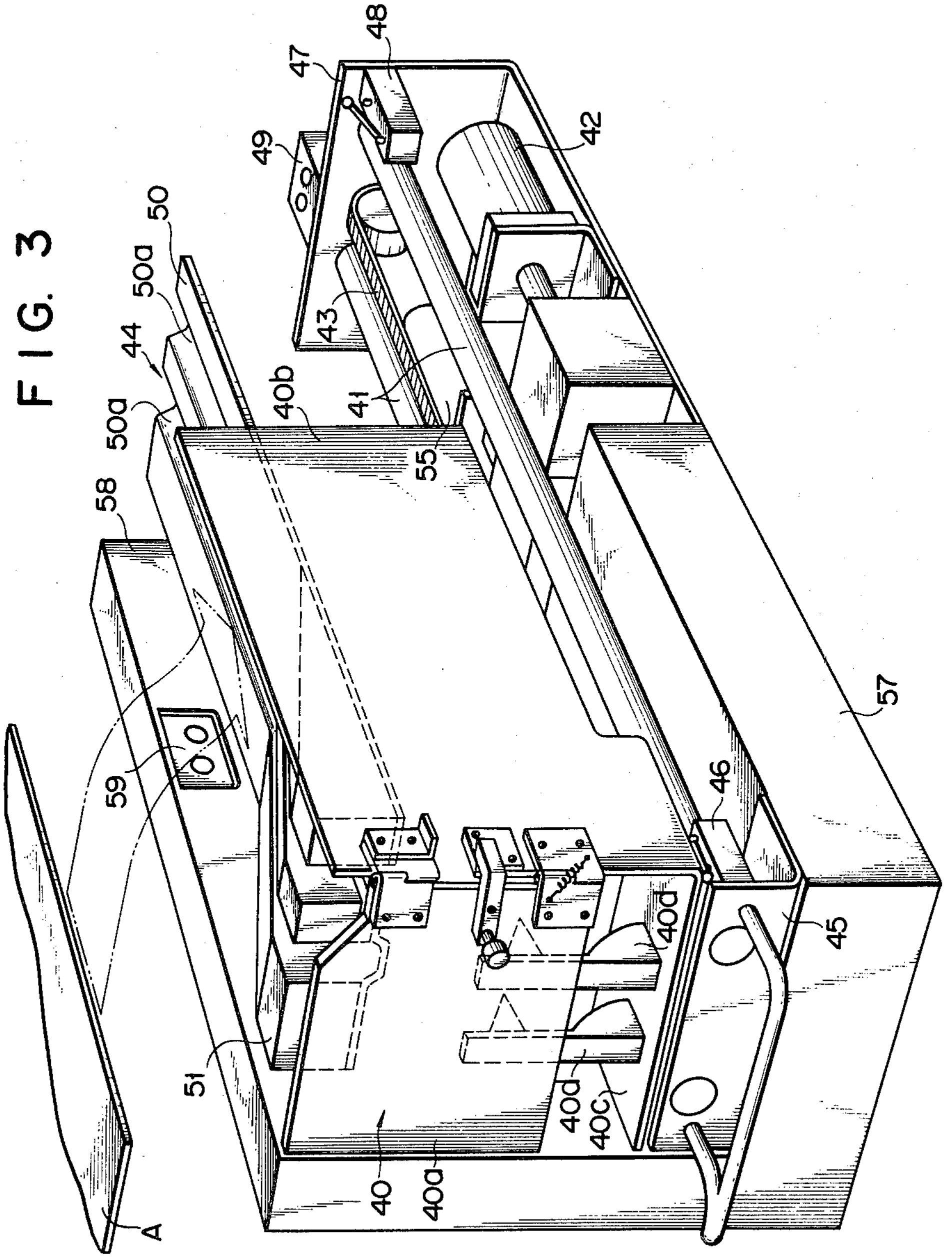
FIGS. 3 and 4 are perspective views showing a stacking section in the embodiment shown in FIG. 1.
Figure 4:
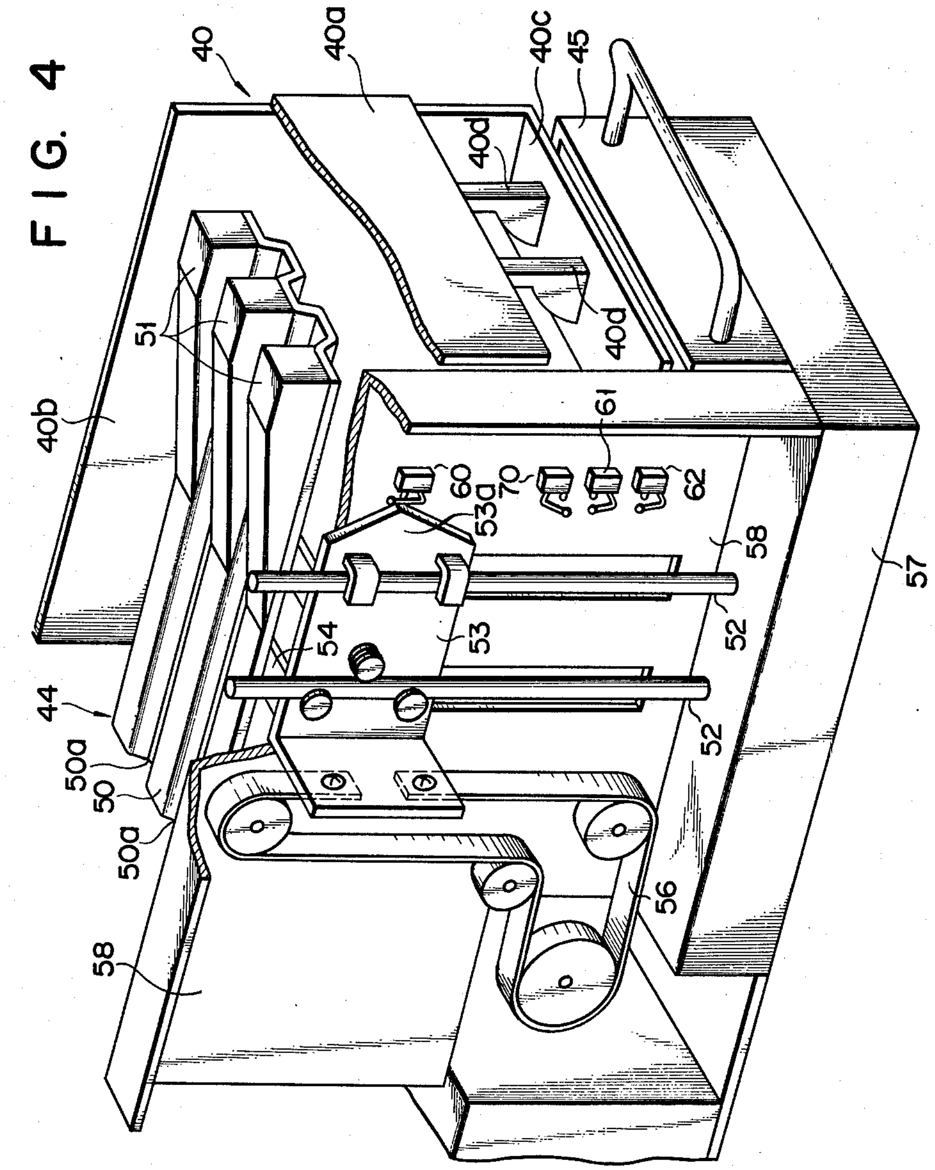

Now, the stacking section 10 mentioned above will be described in detail with reference to FIGS. 3 and 4.

The section includes a push-out member 40 having a push-out plate 40a also serving as a front cover, a side plate 40b, a bottom plate 40c and inclination supporting member *40d*. The bottom plate *40c* of the push-out member is reciprocably supported on rails 41. A belt 43 driven by a push-out member drive reversible motor 42 is coupled to the bottom plate *40a* of the push-out member 40. Thus, as the drive reversible motor 42 is driven in the forward or reverse direction, the push-out member 40 is advanced or retreated in the longitudinal direction of a receiving plate 44. In the neighborhood of a plate member 45, supporting one end of the guide rails 14, a stop-position switch 46 is provided to detect whether the push-out member 40 is in its stop position (i.e., a position at which postal matter A is stacked). In the neighborhood of a plate member 47 supporting the other end of the guide rails 41, a return-position switch 48 is provided to detect whether the push-out member 40 is in its return position (i.e., a position at which the push-out is completed). The switches 46 and 48 are on-off operated by a projection (not shown) extending from the bottom plate *40c* of the push-out member 40, thereby detecting the position of the push-out member 40. On the side of the plate member 47 opposite the guide rails 41, an empty-stack switch 49 is provided to detect whether the tray 15 that corresponds to this stacking section 10 is empty or carries postal matter A. The switch 49 may comprise a light-emitting element and a light-receiving element.

The receiving plate 44 includes a plate member, which is formed with longitudinal guide grooves *50a* which co-operate with the inclination supporting member *40d* mentioned above for guiding the receiving plate, and inclined members 51, which are provided on portions of the plate member other than the portions forming the guide grooves *50a* and on the side of the push-out plate *40a*. The receiving plate 44 is adapted to receive postal matter A that is transferred from either horisontal section transport path *8a*, *8b* or *8c*. The receiving plate 44 is mounted on top of a lateral plate 54 secured to a carriage 53 supported for up and down movement along guide rails 52. A belt 56 driven by a carriage drive reversible motor 55 is coupled to the carriage 53. The receiving plate 44 is thus raised or lowered as the drive reversible motor 55 is driven in the forward or reverse direction. A control circuit 57 which controls the whole stacking section 10 is provided beneath the push-out member 40. A side plate 58 facing the side *40b* of the push-out member 40 extends upright from the control circuit section 57. A postal matter switch 59 is provided on an upper central portion of the side plate 58 to detect postal matter A placed on the receiving plate 44. The switch 59 may consist of a detecting element of a limit-reflection type including a light-emitting element and a light-receiving element. On the side plate 58, there are also provided an upper limit switch 60 for detecting the upper set position of the receiving plate 44, a push-out permission switch 70, a full-stack switch 61 and a lower limit switch 62. The upper limit switch 60 detects whether the receiving plate 44 is in its upper limit position (i.e., in the initial state). The push-out permission switch 70 detects whether it is ready to push out (or take out) postal matter group A stacked. The full-stack switch 61 detects whether the receiving plate 44 is in its position, at which it is full of postal matter. The lower limit switch 62 detects whether the receiving member 44 is in its lower limit position (i.e., push-out position). The switches 46, 48, 60 and 61 may each have a microswitch construction. These microswitches as the detecting elements are arranged along a guid of a carriage 53 and are actuated by the depression of a projection *53a* provided on the carriage 53.

Figure 5:
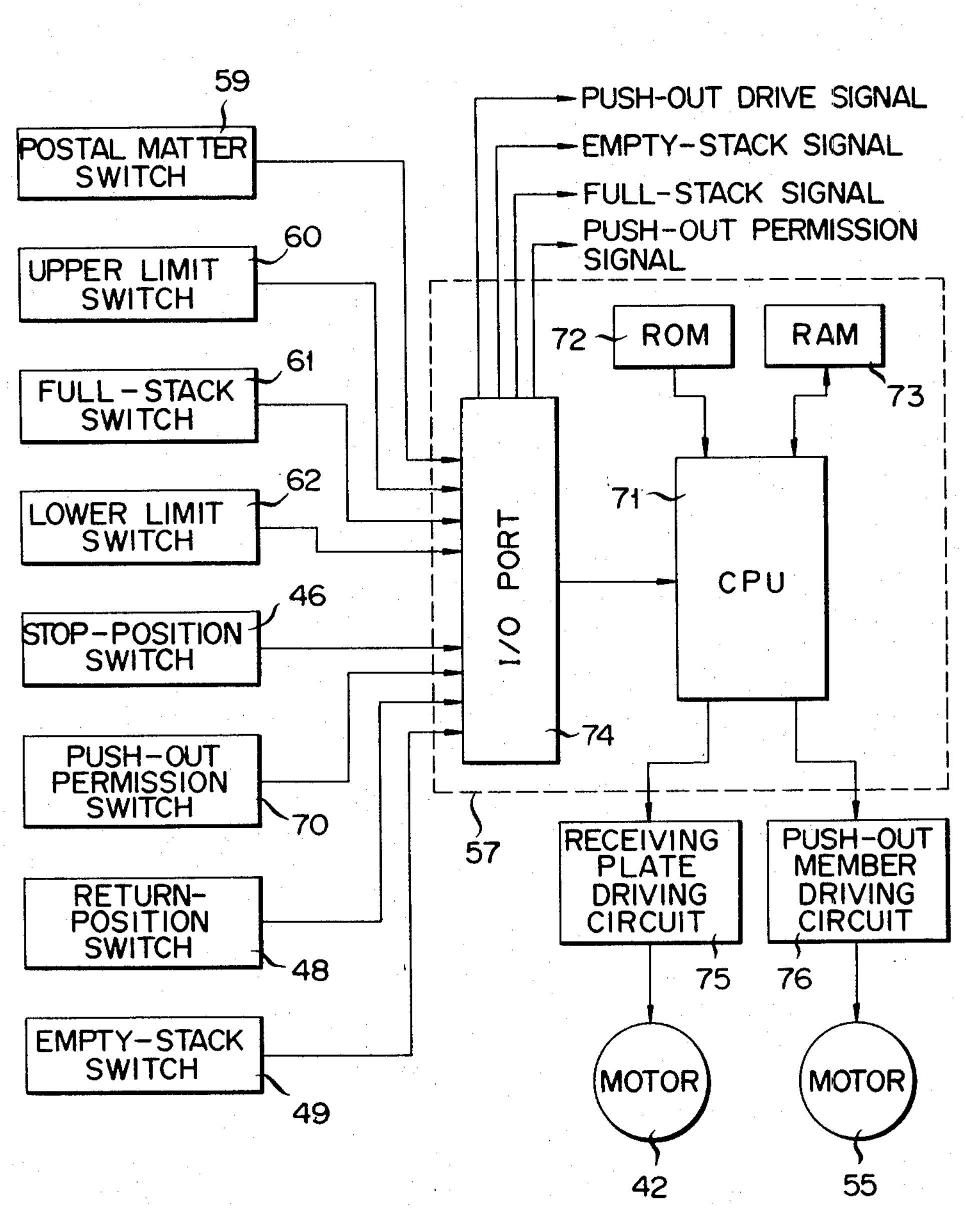
FIG. 5 is a block diagram showing an electric circuit in the stacking section.

FIG. 5 shows the electric circuit of the stacking section 10. The control circuit 57 includes a central processing unit 71, a read only memory 72 where a control program is stored, a random access memory 72 where data to be processed is stored, and an input/output port 74 for fetching data from the switches 59 to 62, 46, 70, 48 and 49. When the control circuit 57 receives a detection signal from the postal mater detecting switch 59, the circuit 57 causes a push-out member driving circuit 76 to drive a motor 55 in the forward direction, thus causing descent of the receiving plate 44 by a distance corresponding to a predetermined quantity of stacked postal matter. Also, during a period from the appearance of a detection signal from the push-out permission switch 70 till the appearance of a detection signal from the full-stack switch 61, the control circuit 57 causes, in response to a detection signal from the empty-stack switch 49, the push-out member driving circuit 76 to drive the motor 55 in the forward direction for causing descent of the receiving plate 44. Further, in response to a detection signal from the lower limit switch 62, it causes driving of a motor 42 in the forward direction for causing one reciprocation of the push-out member 40, or in response to a detection signal from the full-stack switch 61 it causes driving of the motor in the forward direction for causing descent of the receiving plate 44 until a detection signal from the lower limit: switch 62 appears. Subsequently, in response to a detection signal from the empty-stack switch 49 it causes a receiving plate driving circuit 75 to drive the motor 42 in the forward direction for causing one reciprocation of the push-out member 40. During a period from the appearance of a detection signal from the return-position switch 48 to the appearance of a detection signal from the switch 46, the control circuit 57 causes driving of the motor 42 in the reverse direction for returning the push-out member 40 to the appearance of a detection signal from the switch 46 till the appearance of the upper limit switch 60, it causes driving of the motor 55 in the reverse direction for causing ascent of the receiving plate 44 to the initial position.

Figure 6A:
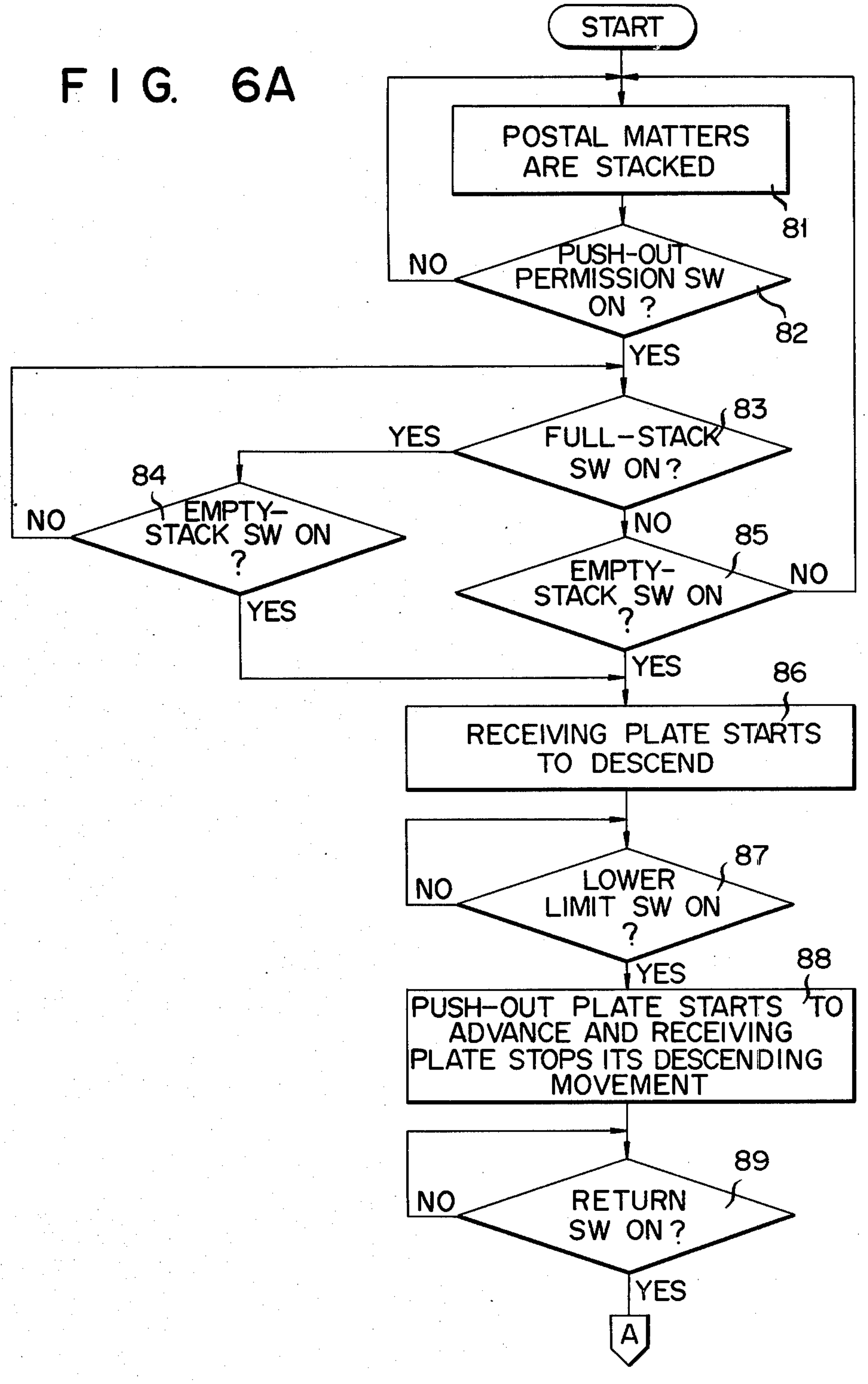
FIGS. 6A and 6B form a flow chart for illustrating the operation of one embodiment of the invention.
Figure 6B:
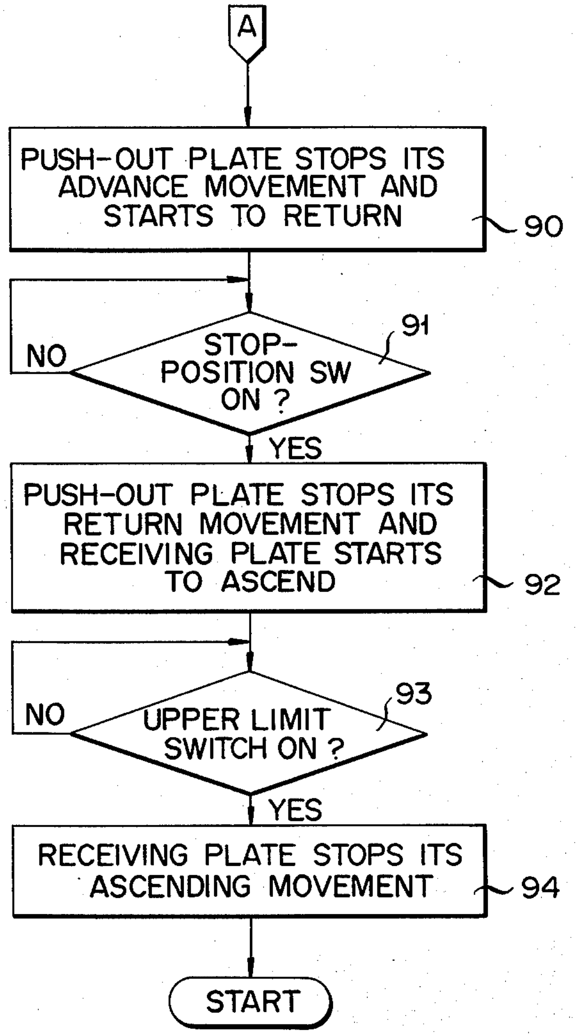

Now, the operation of the above construction will be described with reference to the flow chart of FIGS. 6A and 6B. First, postal matter is stacked in a step 81. More particularly, postal matter A is supplied from either one of the horizontal section transport paths *8a*, *8b* and *8c* and is stacked on the receiving plate 44. When a predetermined quantity of postal matter A is stacked on the receiving plate 44, the postal matter switch 59 is actuated to produce a detection signal, whereupon the control circuit 57 causes driving of the motor 55 in the forward direction for causing descent of the receiving plate 44 by a distance corresponding to the predetermined quantity of postal matter. The operation is repeated until a detection signal from the push-out permission switch is detected in a step 82. When the receiving plate 44 is lowered to a push-out ready position before a full-stack position by a plurality of postal matter pieces A supplied in the above operation, the lowering of the plate 44 is detected by the push-out permission switch 70 in the step 82. When the receiving plate 44 is lowered to the full-stack position by subsequent stacking of additional postal matter A, the lowering of the plate 44 is detected by the full-stack switch 61 in a step 83. If subsequently the empty-stack switch 49 detects an empty tray 15 facing the stacking section 10, during the period from the appearance of a detection signal from the push-out permission switch 70 to the appearance of a detection signal from the full-stack switch 61 in a step 84, the control circuit 57 causes driving of the motor 55 in the forward direction for causing descent of the receiving plate 44 in a step 86. When the control circuit 57 subsequently receives a detection signal from the lower limit switch 62 in a step 87, the circuit 57 stops the motor 55 while causing driving of the motor 42 in the forward direction for causing advancement of the push-out member 40 in the longitudinal direction of the receiving plate 44 in a step 88. Thus, the postal matter A is pushed out by the push-out plate 40*a* toward the back side of the classifying section 7 and transfer onto the empty tray 15 mentioned above. When this transfer is completed, the return-position switch 48 is actuated by the projection of the bottom plate 40*a* of the push-out member 40 to produce a detection signal in a step 89. As a result, the control circuit 57 causes driving of the motor 42 in the reverse direction for causing retreat of the push-out member 40 in the longitudinal direction of the receiving plate 44 in a step 90. When the reaching of the fixed set position by the push-out member 40 is subsequently detected in a step 91, that is, when the stop-position switch 48 is actuated by the projection of the bottom plate 40*c* of the push-out member 40 to produce a detection signal, the control circuit 57 stops the motor 42 to stop the push-out member 40 in a step 92. After the push-out member 40 is stopped, the control circuit 57 causes driving of the motor 55 in the reverse direction for causing ascent of the receiving plate 44. When the reaching of the upper limit position, i.e., initial set position, by the receiving plate 44 is subsequently detected by the upper limit switch 60 in a step 93, the control circuit 57 stops the motor 55 to stop ascent of the receiving plate 44 in a step 94.

In case if no empty tray 15 is detected by the empty-stack switch 49 during the period from the appearance of the detection signal from the push-out permission switch 70 to the appearance of the detection signal from the full-stack switch 61, the control circuit 57 causes driving of the motor 55 in the forward direction for causing descent of the receiving plate 44 in response to a detection signal from the full-stack switch 61 and stops the motor 55 in response to a detection signal from the lower limit switch 62. When the empty-stack switch 49 detects that the aforementioned tray 15 is facing the stacking section 10 and carries no postal matter, the control circuit 57 causes driving of the motor 42 in the forward direction for causing advancement of the push-out member 40 in the longitudinal direction of the receiving plate 44. Subsequently, the same sequence of operation as that in the case when the postal matter A prior to the full stack is transferred as described above is executed, and the full-stack postal matter A in the stacking section 10 is transferred to the corresponding tray 15.

While in the above embodiment whether the receiving plate is in the push-out ready position prior to the full-stack position has been detected by the push-out permission switch that is actuated with the movement of the receiving plate, this arrangement is by no means limitative. For example, it is possible to provide a counter for up-counting according to the postal matter stacked in the stacking section 10 and let the push-out ready state prior to the full stack state be detected by detecting whether the count is a number corresponding to the push-out ready state. Further, while in the above embodiment the transfer section has been provided on the back side of the stacking section, it is also possible to provide the transfer section on the front side or under the stacking section.

The embodiments merely exemplify the invention which may, of course, be constructed in various other forms, some of which may be quite different from the disclosed illustrative embodiments.

However, specific structual and functional details disclosed herein are merely representative and in that regard provide a basis for the claims herein which define the scope of the invention.

What is claimed is:

1. A classifying apparatus with automatic removal device comprising:

(a) means for reading out classifying information provided on matter such as sheets to be classified;

(b) a plurality of stacking sections arranged in a plurality of rows extending one above another each provided with a take-out mechanism;

(c) means for distributing the matter to be classified to said plurality of stacking sections according to classifying information from said reading means;

(d) a transport section driven to successive positions corresponding to said respective stacking sections and receiving the distributedly stacked matter from said stacking section;

(e) means for detecting whether the distributedly stacked matter in said stacking section is in a removal ready state before a full state or in the full stack state;

(f) control means for providing a control signal when the empty transport section is brought to a position corresponding to said stacking section during a period from the detection of the removal ready state of the stacked matter in said stacking section before the full stack state to the detection of the full stack state, or after the detection of the full stack state, these states being detected by said detecting means; and (g) driving means operatively connected to said control means to receive said control signal therefrom, said driving means for driving the removal mechanism of said stacking section in response to the control signal from said control means such that said stacked matter is transferred onto said empty transport section.

2. The classifying apparatus with automatic removal means according to claim 1, wherein said control means is a programmable microprocessor connected to said detecting means and driving means and includes a central processing unit for receiving a timing signal for controlling said driving means and a read only memory device having a fixed program stored therein, said read only memory device having a permanent program having a function of said central processing unit, said control means being capable of executing particular functions according to said permanent program, said detecting means and driving means being controlled by said control means such that said stacked matter in said stacking section is transferred to an empty transport section when said empty transport section is brought to a position corresponding to said stacking section during a period from the detection of the removal ready state of the stacked matter before the full stack state to the detection of the full stack state, or after the detection of the full stack state.

* * * * *